US012784731B2

(12) United States Patent
He et al.

(10) Patent No.: US 12,784,731 B2
(45) Date of Patent: Nov. 3, 2026

(54) AUDIO GENERATION METHOD AND APPARATUS BASED ON LARGE LANGUAGE MODEL, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Huihui He, Beijing (CN); Leyi Wang, Beijing (CN); Xiaomei Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 18/888,701

(22) Filed: Sep. 18, 2024

(65) Prior Publication Data

US 2026/0065891 A1 Mar. 5, 2026

(30) Foreign Application Priority Data

Aug. 29, 2024 (CN) ........................ 202411203682.6

(51) Int. Cl.
*G10L 13/027* (2013.01)
*G10L 13/08* (2013.01)

(52) U.S. Cl.
CPC ............ *G10L 13/027* (2013.01); *G10L 13/08* (2013.01)

(58) Field of Classification Search
CPC ..... G10L 13/027; G10L 13/08; G10L 13/033; G10L 13/047; G10L 13/10; G10L 25/63
See application file for complete search history.

(56) References Cited

U.S. PATENT DOCUMENTS 9,396,180 B1 7/2016 Salvador et al.
2022/0406290 A1* 12/2022 Xue ...................... G10L 13/047
(Continued)

FOREIGN PATENT DOCUMENTS

CN 113808571 A 12/2021
CN 113920977 A 1/2022
(Continued)

OTHER PUBLICATIONS

Ma, Z., Wu, W., Zheng, Z., Guo, Y., Chen, Q., Zhang, S., & Chen, X. (Apr. 2024). Leveraging speech ptm, text llm, and emotional tts for speech emotion recognition. In ICASSP 2024-2024 IEEE International Conference on Acoustics, Speech and Signal Processing (ICASSP) (pp. 11146-11150). IEEE. (Year: 2024).*
(Continued)

*Primary Examiner* — Philip H Lam
(74) *Attorney, Agent, or Firm* — BROOKS KUSHMAN P.C.

(57) ABSTRACT

A method of audio generation based on a large language model is disclosed, which involves the fields of artificial intelligence such as large language models, natural language processing, deep learning, and audio generation. The method of audio generation based on a large language model comprises: acquiring a text to be processed; parsing the text to be processed using the large language model to obtain role information and emotional information corresponding to the text to be processed; obtaining a target reference text and a target reference audio according to the role information and the emotional information; and generating a target audio corresponding to the text to be processed according to the text to be processed, the target reference text, and the target reference audio.

14 Claims, 5 Drawing Sheets

(56) References Cited

U.S. PATENT DOCUMENTS

| | | | | |
|---|---|---|---|---|
| 2023/0298562 | A1* | 9/2023 | Pan | G06F 40/289<br>704/260 |
| 2024/0338532 | A1* | 10/2024 | Pauli | G06F 40/40 |
| 2025/0005282 | A1* | 1/2025 | Moriarty | G06F 16/345 |
| 2025/0078810 | A1* | 3/2025 | Byun | G10L 13/10 |
| 2025/0322821 | A1* | 10/2025 | Tyagi | G10L 13/02 |

FOREIGN PATENT DOCUMENTS

| | | | | |
|---|---|---|---|---|
| CN | 117690407 | A | 3/2024 | |
| CN | 118093864 | A | 5/2024 | |
| CN | 118471191 | A | 8/2024 | |
| WO | WO-2025035667 | A1 * | 2/2025 | G10L 13/047 |

OTHER PUBLICATIONS

Tan, Z., Li, D., Wang, S., Beigi, A., Jiang, B., Bhattacharjee, A., Karami, M., Li, J., Cheng, L., & Liu, H. (2024). Large Language Models for Data Annotation and Synthesis: A Survey. Conference on Empirical Methods in Natural Language Processing. (Year: 2024).*

Notice of Allowance of Chinese patent application No. 202411203682.6 issued Aug. 25, 2025, 10 pages.

Gao et al., Describing and predicting affective messages for expressive speech synthesis, Chapter 93-98, Speech emotion description in speech synthesis, Tsinghua University Journal (Natural Sciences), Feb. 15, 2017, 19 pages.

Samal et al., Role of machine learning and deep learning techniques in EEG-based BCI emotion recognition system: a review, Artificial Intelligence Review, Feb. 13, 2024, 57:50, pp. 1-66.

* cited by examiner

AUDIO GENERATION METHOD AND APPARATUS BASED ON LARGE LANGUAGE MODEL, ELECTRONIC DEVICE, AND STORAGE MEDIUM

CROSS-REFERENCE TO RELATED APPLICATION

The present application claims the priority and benefit of Chinese Patent Application No. 202411203682.6, filed on Aug. 29, 2024, with the title of "AUDIO GENERATION METHOD AND APPARATUS BASED ON LARGE LANGUAGE MODEL". The disclosure of the above application is incorporated herein by reference in its entirety.

TECHNICAL FIELD

The present application relates to the field of internet technology, and in particular to the field of artificial intelligence such as large language models, natural language processing, deep learning, and audio generation. It provides an audio generation method and apparatus based on a large language model, as well as an electronic device and a readable storage medium.

BACKGROUND OF THE DISCLOSURE

When generating audio, it is necessary to ensure that the generated audio has high accuracy and authenticity as much as possible. The existing technology typically uses an "emotion classification model+deep learning-based voice synthesis model" for audio synthesis. However, both models require a large amount of labeled data for training, which leads to the problems of high training costs and low training efficiency, thereby reducing the efficiency and accuracy of audio generation.

SUMMARY OF THE DISCLOSURE

According to a first aspect of the present application, there is provided a method of audio generation based on a large language model, comprising: acquiring a text to be processed; parsing the text to be processed using the large language model to obtain role information and emotional information corresponding to the text to be processed; obtaining a target reference text and a target reference audio according to the role information and the emotional information; and generating a target audio corresponding to the text to be processed according to the text to be processed, the target reference text, and the target reference audio.

According to a second aspect of the present application, there is provided an electronic device, including: at least one processor; and a memory communicatively connected with the at least one processor; wherein the memory stores instructions executable by the at least one processor, and the instructions are executed by the at least one processor to enable the at least one processor to perform a method of audio generation based on a large language model, wherein the method includes: acquiring a text to be processed; parsing the text to be processed using the large language model to obtain role information and emotional information corresponding to the text to be processed; obtaining a target reference text and a target reference audio according to the role information and the emotional information; and generating a target audio corresponding to the text to be processed according to the text to be processed, the target reference text, and the target reference audio.

According to a third aspect of the present application, there is provided a non-transitory computer readable storage medium with computer instructions stored thereon, wherein the computer instructions are used for causing a method of audio generation based on a large language model, wherein the method includes: acquiring a text to be processed; parsing the text to be processed using the large language model to obtain role information and emotional information corresponding to the text to be processed; obtaining a target reference text and a target reference audio according to the role information and the emotional information; and generating a target audio corresponding to the text to be processed according to the text to be processed, the target reference text, and the target reference audio.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones.

Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
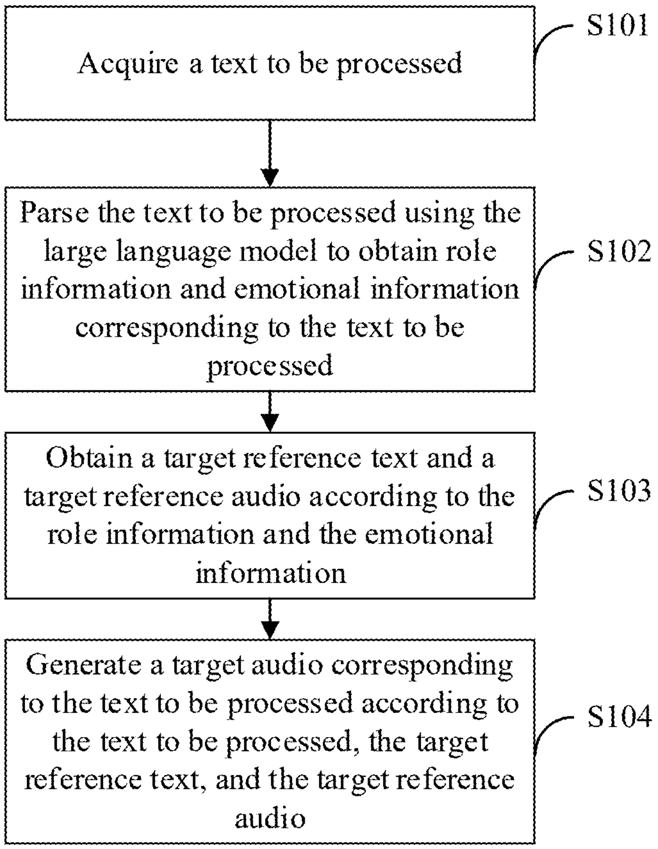
FIG. 1 is a schematic diagram according to the first embodiment of the present application.

FIG. 1 is a schematic diagram according to the first embodiment of the present application. As shown in FIG. 1, the method of audio generation based on a large language model in the present embodiment specifically includes the following steps of:

S101, acquiring a text to be processed;

S102, parsing the text to be processed using the large language model to obtain role information and emotional information corresponding to the text to be processed;

S103, obtaining a target reference text and a target reference audio according to the role information and the emotional information;

S104, generating a target audio corresponding to the text to be processed according to the text to be processed, the target reference text, and the target reference audio.

The method of audio generation based on a large language model in the present embodiment, on one hand, parses the text to be processed with the large language model, and by leveraging the powerful text understanding capabilities of the large language model, it can improve the accuracy of the obtained role information and emotional information, and thereby improves the accuracy of the obtained target reference text and target reference audio. On the other hand, in addition to using the text to be processed, it also combines the target reference text and the target reference audio to generate the target audio. Since the target reference text and the target reference audio are obtained according to the role information and the emotional information, the generated target audio can better match the role corresponding to the text to be processed and the emotions of the role, thereby improving the accuracy of the generated target audio and enhancing the authenticity of the generated target audio.

In addition, since the role information and the emotional information in the present embodiment are obtained according to the current text to be processed, the present embodiment can switch the reference text and the reference audio used in generating audio when the role and/or emotion change for different texts to be processed, thereby achieving the purpose of generating different audio for different roles and/or different emotions.

The text to be processed acquired in the present embodiment by executing S101 can be a single sentence, that is, the text to be processed includes only one sentence; alternatively, the text to be processed acquired in the present embodiment by executing S101 can include a plurality of sentences.

If the text to be processed includes a plurality of sentences, the present embodiment processes different sentences in the text to be processed separately and generates audio corresponding to each sentence. Finally, the present embodiment can either use the generated a plurality of audios as the target audio or use the combined result of the generated a plurality of audios as the target audio.

The present embodiment does not limit the type of text corresponding to the text to be processed. For example, the text to be processed can be one or more sentences in a novel text, or one or more sentences in a story text, etc.

Taking a novel text as an example, when executing S101 to acquire the text to be processed, the present embodiment can first acquire the novel text, then segment the novel text at the sentence level (for example, ending with a period, exclamation mark, question mark, quotation mark, etc.), and finally acquire one or more sentences obtained from the segmentation as the text to be processed. In the present embodiment, the target audio corresponding to the novel text is generated according to all sentences in the novel text.

Since the large language model has a limit on the number of words in the text input each time, in the case where the text to be processed includes a plurality of sentences, the number of characters in the text to be processed acquired by executing S101 in the present embodiment cannot exceed a preset character count threshold, for example, the number of characters in the text to be processed is less than or equal to 2000.

After executing S101 to acquire the text to be processed, the present embodiment executes S102 to parse the text to be processed using the large language model to obtain role information and emotional information corresponding to the text to be processed.

If the text to be processed includes a plurality of sentences, the present embodiment uses the large language model to parse each sentence in the text to be processed separately when executing S102, so as to obtain the role information and the emotional information corresponding to each sentence.

In the present embodiment, the large language model (LLM) is a deep learning model trained with a large amount of text data, which can generate natural language text or understanding the meaning of natural language text. The large language model can handle a variety of natural language tasks, such as text classification, question answering, dialogue, etc., and is an important approach to artificial intelligence.

When executing S102 to parse the text to be processed using the large language model, the present embodiment can use the text to be processed as the input of the large language model and obtain the role information and the emotional information corresponding to the text to be processed according to the output result of the large language model.

In the present embodiment, the role information obtained in the present embodiment by executing S102 corresponds to a certain role, such as character A, character B, character C, or a narrator role in a novel, etc. The emotional information corresponds to the emotional category of the role, such as "neutral", "happy", "sad", "angry", "fearful", "surprised", etc.

It can be understood that the role information corresponding to a sentence can be one or more (usually two). For example, the role information corresponding to a sentence can be character A, indicating that the sentence includes only the text corresponding to character A, or character A and the narrator role, indicating that the sentence includes both the text corresponding to character A and the narrator text.

Therefore, when executing S102 in the present embodiment, if the same sentence includes a plurality of role information, the large language model will output the emotional information corresponding to the different role information for each role information.

Further, when executing S102 to parse the text to be processed using the large language model, the present embodiment can further obtain role annotation information according to the output result of the large language model.

In the present embodiment, the role annotation information is used to reflect the age, gender, etc., of the role. For example, the role annotation information can be "man", "woman", "boy", "girl", "old person", "young person", etc.

For example, if the text to be processed is (Character A said: "It's too heavy, big sister can hardly hold it."), then the role information obtained by executing S102 in the present embodiment is character A, the emotional information is "happy", and the role annotation information is "woman".

If the text to be processed is (The little guy laughs with eyes curved in the arms of character A, nodding his little head vigorously, "Uh-huh, character B has grown taller again, this tall, this tall."), then by executing S102 in the present embodiment, for the part of the text "The little guy laughs with eyes curved in the arms of character A, nodding his little head vigorously", the obtained role information is the narrator role, and the emotional information is "neutral"; for the part of the text "Uh-huh, character B has grown taller again, this tall, this tall", the obtained role information is character B, the emotional information is "happy", and the role annotation information is "boy".

In addition, when executing S102 to parse the text to be processed using the large language model, the present embodiment can also input a preset prompt text together with the text to be processed into the large language model.

The preset prompt text in the present embodiment can be "Parse the input text and output the role information and the emotional information corresponding to the text."

In order to further improve the accuracy of the large language model in parsing the text to be processed, the preset prompt text in the present embodiment can also include more detailed information, such as role tasks, tool capability requirements and limitations, examples, etc.

In the present embodiment, the role tasks in the preset prompt text can include the following content: As the role annotation function of a novel reader, your task is to receive the text input by the user and automatically annotate each sentence by which the role who reads it and the emotion expressed by the sentence; you need to analyze the dialogue and narration in the text, identify the lines of different roles, and judge their emotions.

The tool capabilities in the preset prompt text can include the following content: (1) Text analysis: You need to have strong text analysis capabilities and be able to identify role words and emotion words in sentences in order to accurately judge the lines and emotions of roles; (2) Role recognition: By identifying the dialogue and narration in the text, you need to be able to distinguish the lines of different roles and generate corresponding annotation information for each role; for each role, you need to provide role annotation information such as "man", "boy", "woman", "girl", etc., for example, "character A+woman", "character C+girl"; (3) Emotion judgment: Based on the content and context of the sentence, you need to be able to judge the emotion expressed by the sentence, such as "joy", "sadness", "anger", etc.

The requirements and restrictions in the preset prompt text can include the following content: (1) Accuracy: Your annotation results need to be highly accurate, and capable of truly reflecting the roles and emotions in the text; (2) Originality: Do not modify the input text, and the narrator cannot reduce sentences; (3) Mergability: Adjacent sentences with the same "role+emotion" should be merged.

The examples in the preset prompt text can include the following content: Input: "My head hurts so much . . . ." As soon as character C moves, a sharp pain shot through the head, feeling like it was splitting apart; Output: "Character C+woman+neutral": "My head hurts so much . . . ", "Narrator+woman+neutral": As soon as character C moves, a sharp pain shot through the head, feeling like it was splitting apart.

After executing S102 to obtain the role information and the emotional information corresponding to the text to be processed, the present embodiment executes S103 to obtain the target reference text and the target reference audio according to the role information and the emotional information.

In the present embodiment, when executing S103 to obtain the target reference text and the target reference audio according to the role information and the emotional information, the implementation method that can be adopted in the present embodiment is: selecting a dataset corresponding to the role information from a plurality of datasets as the target dataset, which includes reference texts and reference audios corresponding to different emotions of the role; selecting the reference text and the reference audio corresponding to the emotional information from the target dataset as the target reference text and the target reference audio.

In the present embodiment, different datasets correspond to different roles, each dataset has preset reference texts and reference audios corresponding to different emotions of the corresponding role. For example, the dataset corresponding to character A includes reference texts and reference audios corresponding to the neutral emotion of character A, reference texts and reference audios corresponding to the happy emotion of character A, etc. Further, the timbre of the reference audio in the dataset corresponding to character A is consistent with the timbre of character A.

In the present embodiment, the reference texts and reference audios corresponding to different emotions in a dataset appear in pairs, with different reference audios corresponding to different emotions. The reference audio is the audio corresponding to the reference text, that is, the reference audio is subjected to speech recognition, and the result of speech recognition is consistent with the reference text.

That is, the present embodiment can obtain the corresponding target reference text and target reference audio in real-time according to the obtained role information and emotional information corresponding to the current text to be processed by pre-setting different datasets, enabling the present embodiment to generate audio corresponding to different roles (or different timbres) and emotions by switching reference texts and reference audios, which can simplify the steps of audio generation and improving the efficiency of audio generation.

When executing S103, the present embodiment can also include: in response to determining that there is no dataset corresponding to the role information, acquiring the role annotation information output by the large language model, for example, in the case where the role information output by the large language model is an unknown role, determining that there is no target dataset corresponding to the role information; and selecting a dataset corresponding to the role annotation information from the plurality of datasets as the target dataset.

For example, if the role annotation information output by the large language model is "woman", the present embodiment will use the dataset corresponding to "woman" as the target dataset. That is, in addition to pre-setting datasets corresponding to different roles, the present embodiment will also pre-set datasets corresponding to different role annotation information, such as datasets corresponding to "woman", "man", etc.

That is, the present embodiment can also select the target dataset according to the role annotation information, thereby ensuring that the target dataset can still be selected and the target reference text and the target reference audio can be obtained for generating the target audio even when the target dataset cannot be determined according to the role information.

It can be understood that if the present embodiment fails to select the reference text and the reference audio corresponding to the emotional information by executing S103, it can obtain the reference text and the reference audio corresponding to the preset emotional information as the target reference text and the target reference audio, with the preset emotional information being neutral emotion, etc.

After executing S103 to obtain the target reference text and the target reference audio, the present embodiment executes S104 to generate the target audio corresponding to the text to be processed according to the text to be processed, the target reference text, and the target reference audio.

When executing S104, the present embodiment can input the text to be processed, the obtained target reference text and the target reference audio into a pre-trained audio generation model, and then use the output result of the audio generation model as the target audio corresponding to the text to be processed.

The audio generation model in the present embodiment is pre-trained and can output a target audio corresponding to the text to be processed according to the input text to be processed, the reference text, and the reference audio, with the timbre, emotion, and other information of the target audio being consistent with the reference audio.

That is, when generating the target audio corresponding to the text to be processed, in addition to the target reference audio, the present embodiment also uses the target reference text corresponding to the target reference audio, which can further improve the similarity between the target audio and the target reference audio, and obtain a higher quality target audio.

After executing S104 to generate the target audio, the present embodiment can also play the generated target audio, thereby achieving the purpose of real-time reading of the text to be processed.

Figure 2:
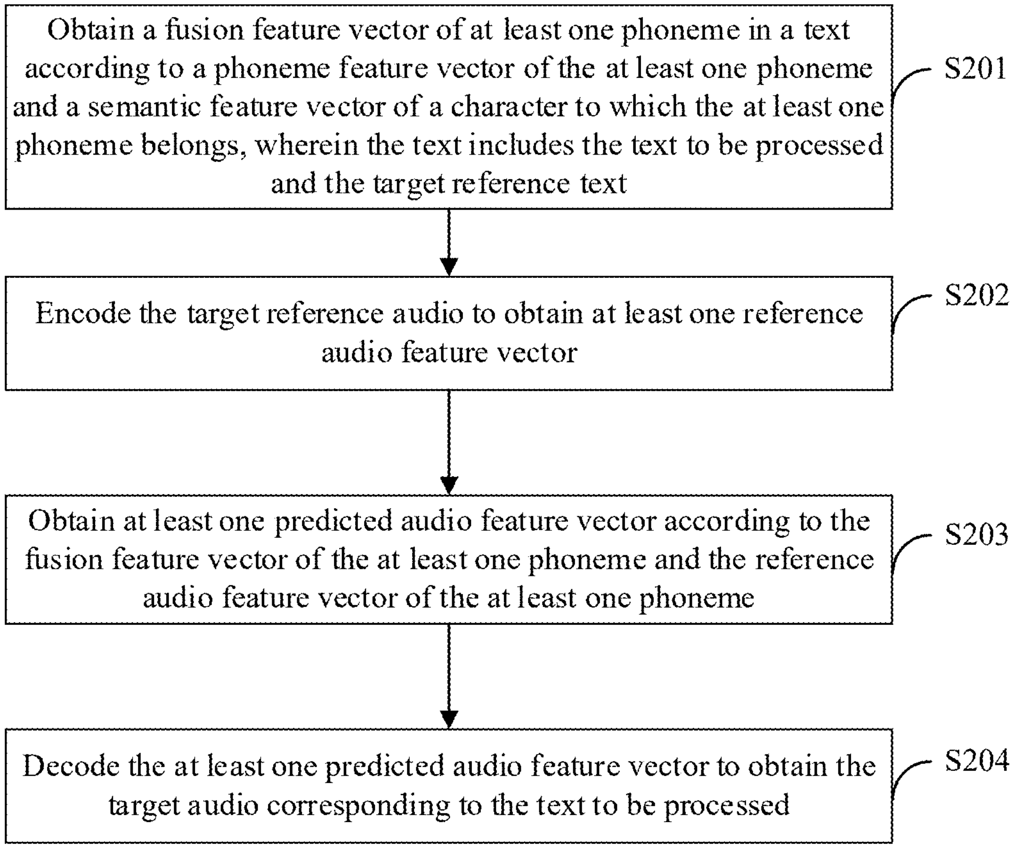
FIG. 2 is a schematic diagram according to the second embodiment of the present application.

FIG. 2 is a schematic diagram according to the second embodiment of the present application. As shown in FIG. 2, when executing S104 "generating a target audio corresponding to the text to be processed according to the text to be processed, the target reference text, and the target reference audio", the present embodiment can include the following steps of.

- S201, obtaining a fusion feature vector of at least one phoneme in a text according to a phoneme feature vector of the at least one phoneme and a semantic feature vector of a character to which the at least one phoneme belongs, wherein the text includes the text to be processed and the target reference text;
- S202, encoding the target reference audio to obtain at least one reference audio feature vector;
- S203, obtaining at least one predicted audio feature vector according to the fusion feature vector of at least one phoneme and the reference audio feature vector of at least one phoneme;
- S204, decoding the at least one predicted audio feature vector to obtain the target audio corresponding to the text to be processed.

That is, in addition to using the reference audio feature vector obtained from the target reference audio, the present embodiment also obtains a predicted audio feature vector according to the fusion feature vector of each phoneme in the text to be processed and the target reference text, and then obtains the target audio according to the predicted audio vector. The present embodiment fuses the phoneme feature vector with the semantic feature vector, which can fully utilize the semantic information of the text, and there is a corresponding relationship between the target reference audio and the target reference text, thereby enhancing the similarity of timbre and emotion between the target audio and the target reference audio based on semantic information, and obtaining a more accurate (for example, timbre and emotion more accurate) and more realistic target audio.

When executing S201 to obtain the phoneme feature vector, the present embodiment can first convert the text (the text to be processed and the target reference text) into a phoneme sequence, and then perform an embedding processing on at least one phoneme in the phoneme sequence to obtain the phoneme feature vector of at least one phoneme.

For example, if the text is 一共"(yī góng), the phoneme sequence corresponding to the text is "y i2 G ong4" the numbers represent tones), then the phonemes corresponding to the character "一"(yī) are "y" and "i2", and the phonemes corresponding to the character "共"(góng) are "g" and "ong4".

When executing S201 to perform embedding processing on at least one phoneme in the phoneme sequence, the present embodiment can first convert at least one phoneme into at least one phoneme identifier, and then use a preset phoneme vocabulary to perform embedding processing on at least one phoneme identifier to obtain the phoneme feature vector of at least one phoneme. In the present embodiment, different phonemes correspond to different phoneme identifiers.

For example, for the character "一"(yī), if the phoneme identifier corresponding to the phoneme "y" is "1" and the phoneme identifier corresponding to the phoneme "i2" is "2", the present embodiment can obtain the phoneme identifier sequence [1, 2]; then the embedding processing is performed on the phoneme identifier sequence to obtain the phoneme feature vector sequence [1_v, 2_v]. In the present embodiment, "1 _v" is the phoneme feature vector corresponding to the phoneme "y" and "2_v" is the phoneme feature vector corresponding to the phoneme "i2".

That is, the present embodiment obtains the phoneme feature vector by converting phonemes into phoneme identifiers and then performing an embedding processing on the phoneme identifiers, which can improve the accuracy of the phoneme feature vector.

When executing S201 to obtain the semantic feature vector of a character, the present embodiment can first obtain the semantic representation of the character, for example, by inputting the text into a BERT model and obtaining the semantic representation of at least one character in the text according to the output result of the BERT model, and then performing an embedding processing on the semantic representation of at least one character to obtain the semantic feature vector of at least one character.

For example, if the text is "一共"(yī góng), which includes the two characters "一"(yī) and "共"(góng), the semantic representation corresponding to the character "一"(yī) can be "3" and the semantic representation corresponding to the character "共"(góng) can be "4". A preset semantic vocabulary is used to perform embedding on the semantic representation to obtain the semantic feature vector "3_v" corresponding to the character "一"(yī) and the semantic feature vector "4_v" corresponding to the character "共" (góng).

That is, the present embodiment obtains the semantic feature vector by converting characters into semantic representations and then performing an embedding processing on the semantic representations, which can improve the accuracy of the semantic feature vector.

When executing S201 to obtain the fusion feature vector of phonemes according to the phoneme feature vector of phonemes and the semantic feature vector of the characters to which the phonemes belong, the present embodiment can obtain the fusion feature vector by adding or concatenating the phoneme feature vector and the semantic feature vector.

For example, for the phoneme "y" in the character "一"(yī), if the phoneme feature vector of this phoneme is "1_v" and the semantic feature vector of the character "一"(yī) to which this phoneme belongs is "3_v", then the present embodiment fuses "1_v" and "3_v" and uses the fusion result as the fusion feature vector corresponding to the phoneme "y".

That is, the present embodiment fuses the semantic feature vector of a character with the phoneme feature vector of at least one phoneme corresponding to the character, enabling a more comprehensive utilization of the semantic information and phoneme information of the text (including the target reference text and the text to be processed) when generating the target audio.

When executing S202 to encode the target reference audio and obtain at least one reference audio feature vector, the present embodiment can first encode the target reference audio and obtain at least one reference audio representation according to the encoding result. The audio representation in the present embodiment can be a digital character, and different audio representations are related to timbre, emotion, etc. Then an embedding processing is performed on at least one reference audio representation to obtain at least one reference audio feature vector.

For example, if at least one reference audio representation obtained by the present embodiment is [10, 11], an embedding is performed on the reference audio representation using a preset audio vocabulary to obtain at least one reference audio vector [10_v, 11_v].

When executing S203 to obtain at least one predicted audio feature vector according to the fusion feature vector of at least one phoneme and at least one reference audio feature vector, the present embodiment can first fuse the fusion feature vector of at least one phoneme with at least one reference audio feature vector to obtain at least one feature vector to be processed, and then encode at least one feature vector to be processed to obtain at least one predicted audio feature vector.

In addition, when executing S203, the present embodiment can also input the fusion feature vector of at least one phoneme and at least one reference audio feature vector into a pre-trained neural network audio encoding model, and use the output result of the neural network audio encoding model as at least one predicted audio feature vector.

When executing S204 to decode at least one predicted audio feature vector, the present embodiment can decode at least one predicted audio feature vector according to the decoding method corresponding to an encoding method of the target reference audio, thereby obtaining the target audio corresponding to the text to be processed.

Figure 3:
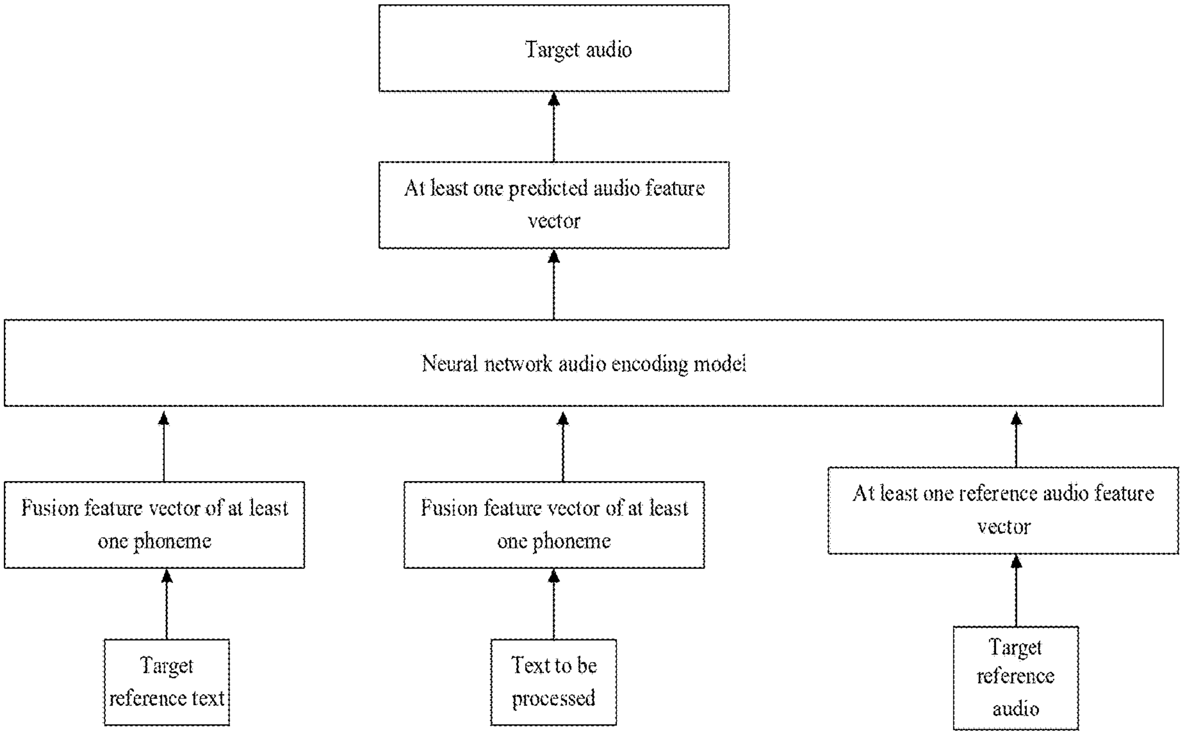
FIG. 3 is a schematic diagram according to the third embodiment of the present application.

FIG. 3 is a schematic diagram according to the third embodiment of the present application. FIG. 3 shows a flowchart of the present embodiment when generating the target audio corresponding to the text to be processed according to the text to be processed, the target reference text, and the target reference audio. As shown in FIG. 3, the present embodiment first obtains the fusion feature vector of at least one phoneme corresponding to the target reference text, the fusion feature vector of at least one phoneme corresponding to the text to be processed, and at least one reference audio feature vector corresponding to the target reference audio. Then, through a neural network audio encoding model, the present embodiment obtains at least one predicted audio feature vector according to the fusion feature vector of at least one phoneme and the reference audio feature vector of at least one phoneme. Finally, the present embodiment obtains the target audio corresponding to the text to be processed according to at least one predicted audio feature vector.

Figure 4:
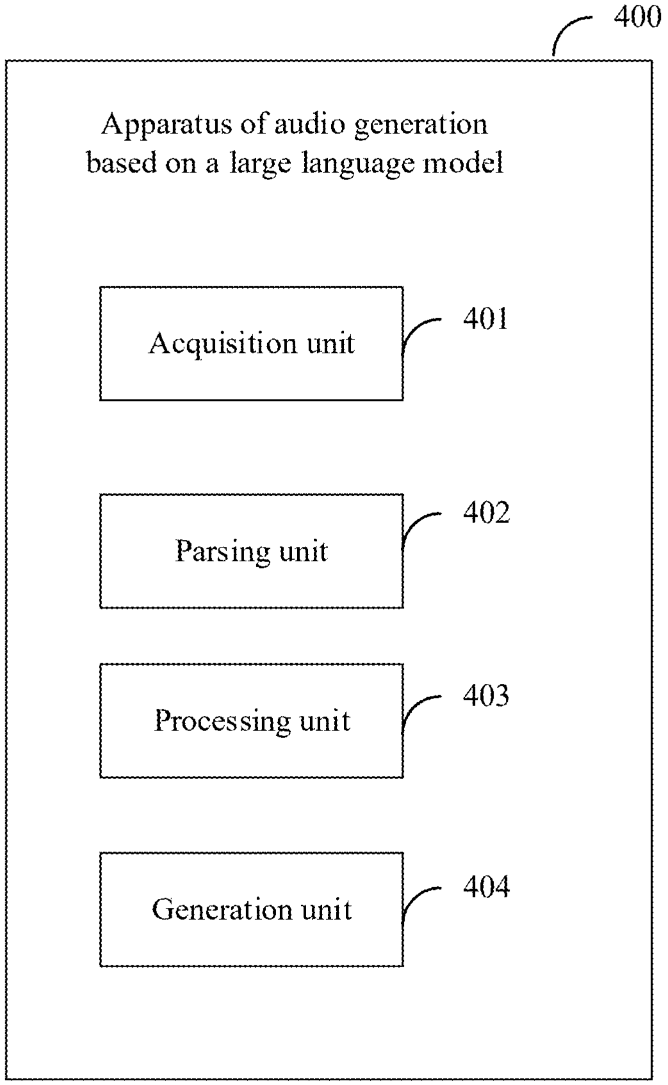
FIG. 4 is a schematic diagram according to the fourth embodiment of the present application.

FIG. 4 is a schematic diagram according to the fourth embodiment of the present application.

As shown in FIG. 4, the audio generation apparatus 400 based on a large language model in the present embodiment includes:

- an acquisition unit 401, configured to acquire a text to be processed;
- a parsing unit 402, configured to parse the text to be processed using the large language model to obtain the role information and emotional information corresponding to the text to be processed;
- a processing unit 403, configured to obtain a target reference text and a target reference audio according to the role information and emotional information;
- a generation unit 404, configured to generate a target audio corresponding to the text to be processed according to the text to be processed, the target reference text, and the target reference audio.

The text to be processed acquired by the acquisition unit 401 can be a single sentence, that is, the text to be processed includes only one sentence; alternatively, the text to be processed acquired by the present embodiment can include a plurality of sentences.

If the text to be processed includes a plurality of sentences, the present embodiment processes different sentences in the text to be processed separately, and generates audio corresponding to each sentence. Finally, the present embodiment can either use the generated a plurality of audios as the target audio or use the combined result of the generated a plurality of audios as the target audio.

The present embodiment does not limit the type of text corresponding to the text to be processed. For example, the text to be processed can be one or more sentences in a novel text, or one or more sentences in a story text, etc.

Since the large language model has a limit on the number of words in the text input each time, in the case where the text to be processed includes a plurality of sentences, the number of characters in the text to be processed acquired by the acquisition unit 401 cannot exceed a preset character count threshold, for example, the number of characters in the text to be processed is less than or equal to 2000.

After the acquisition unit 401 acquires the text to be processed, the parsing unit 402 parses the text to be processed using the large language model to obtain the role information and emotional information corresponding to the text to be processed.

If the text to be processed includes a plurality of sentences, the parsing unit 402 uses the large language model to parse each sentence in the text to be processed separately, so as to obtain the role information and the emotional information corresponding to each sentence.

In the present embodiment, the large language model (LLM) is a deep learning model trained with a large amount of text data, which can generate natural language text or understanding the meaning of natural language text. The large language model can handle a variety of natural language tasks, such as text classification, question answering, dialogue, etc., and is an important approach to artificial intelligence.

When the parsing unit 402 parses the text to be processed using the large language model, it can use the text to be processed as the input of the large language model and obtain the role information and the emotional information corresponding to the text to be processed according to the output result of the large language model.

In the present embodiment, the role information obtained by the parsing unit 402 corresponds to a certain role, such as character A, character B, character C, or a narrator role in a novel, etc. The emotional information corresponds to the emotional category of the role, such as “neutral”, “happy”, “sad”, “angry”, “fearful”, “surprised”, etc.

Further, when the parsing unit 402 parses the text to be processed using the large language model, it can also further obtain role annotation information according to the output result of the large language model.

In the present embodiment, the role annotation information is used to reflect the age, gender, etc., of the role. For example, the role annotation information can be "man", "woman", "boy", "girl", "old person", "young person", etc.

In addition, when the parsing unit 402 parses the text to be processed using the large language model, it can also input a preset prompt text together with the text to be processed into the large language model.

The preset prompt text in the present embodiment can be "Parse the input text and output the role information and the emotional information corresponding to the text."

In order to further improve the accuracy of the large language model's parsing of the text to be processed, the preset prompt text in the present embodiment can also include more detailed information, such as role tasks, tool capability requirements and limitations, examples, etc.

After the parsing unit 402 obtains the role information and the emotional information corresponding to the text to be processed, the processing unit 403 obtains the target reference text and the target reference audio according to the role information and emotional information.

When obtaining the target reference text and target reference audio according to the role information and the emotional information, the processing unit 403 can adopt the following implementation method: selecting a dataset corresponding to the role information from a plurality of datasets as the target dataset; selecting the reference text and the reference audio corresponding to the emotional information from the target dataset as the target reference text and the target reference audio.

In the present embodiment, different datasets correspond to different roles, each dataset has preset reference texts and reference audios corresponding to different emotions of the corresponding role.

In the present embodiment, the reference texts and reference audios corresponding to different emotions in a dataset appear in pairs, with different reference audios corresponding to different emotions. The reference audio is the audio corresponding to the reference text, that is, the reference audio is subjected to speech recognition, and the result of speech recognition is consistent with the reference text.

That is, the present embodiment enables the processing unit 403 to obtain the corresponding target reference text and target reference audio in real-time according to the obtained role information and emotional information corresponding to the current text to be processed, by pre-setting different datasets, allowing the present embodiment to generate audio corresponding to different roles (or different timbres) and emotions by switching reference texts and reference audios, which can simplify the steps of audio generation and improving the efficiency of audio generation.

The processing unit 403 can also include: in response to determining that there is no dataset corresponding to the role information, acquiring the role annotation information output by the large language model; and selecting a dataset corresponding to the role annotation information from a plurality of datasets as the target dataset.

That is, the processing unit 403 can also select the target dataset according to the role annotation information, thereby ensuring that the target dataset can still be selected and the target reference text and the target reference audio can be obtained for generating the target audio even when the target dataset cannot be determined according to the role information.

It can be understood that if the processing unit 403 fails to select the reference text and the reference audio corresponding to the emotional information, it can obtain the reference text and the reference audio corresponding to the preset emotional information as the target reference text and the target reference audio, with the preset emotional information being neutral emotion, etc.

After the processing unit 403 obtains the target reference text and the target reference audio, the generation unit 404 generates the target audio corresponding to the text to be processed according to the text to be processed, the target reference text, and the target reference audio.

The generation unit 404 can input the text to be processed, the obtained target reference text and the target reference audio into a pre-trained audio generation model, and then use the output result of the audio generation model as the target audio corresponding to the text to be processed.

The audio generation model in the present embodiment is pre-trained and can output a target audio corresponding to the text to be processed according to the input text to be processed, the reference text, and the reference audio, with the timbre, emotion, and other information of the target audio being consistent with the reference audio.

That is, when generating the target audio corresponding to the text to be processed, in addition to the target reference audio, the generation unit 404 also uses the target reference text corresponding to the target reference audio, which can further improve the similarity between the target audio and the target reference audio, obtaining higher quality target audio.

After generating the target audio, the generation unit 404 can also play the generated target audio, thereby achieving the purpose of real-time reading of the text to be processed.

In addition, when generating the target audio corresponding to the text to be processed based on the text to be processed, the target reference text, and the target reference audio, the generation unit 404 can also include: obtaining the fusion feature vector of at least one phoneme based on the phoneme feature vector of at least one phoneme and the semantic feature vector of the character to which the at least one phoneme belongs, wherein the text includes the text to be processed and the target reference text; encoding the target reference audio to obtain at least one reference audio feature vector; obtaining at least one predicted audio feature vector based on the fusion feature vector of at least one phoneme and the reference audio feature vector of at least one phoneme; decoding the at least one predicted audio feature vector to obtain the target audio corresponding to the text to be processed.

That is, the generation unit 404, in addition to using the reference audio feature vector obtained from the target reference audio, also obtains a predicted audio feature vector according to the fusion feature vector of each phoneme in the text to be processed and the target reference text, and then obtains the target audio according to the predicted audio vector. The present embodiment fuses the phoneme feature vector with the semantic feature vector, which can fully utilize the semantic information of the text, and there is a corresponding relationship between the target reference audio and the target reference text, thereby enhancing the similarity of timbre and emotion between the target audio and the target reference audio based on semantic information, and obtaining a more accurate (for example, timbre and emotion more accurate) and more realistic target audio.

When obtaining the phoneme feature vector, the generation unit 404 can first convert the text (the text to be processed and the target reference text) into a phoneme sequence, and then perform an embedding processing on at least one phoneme in the phoneme sequence to obtain the phoneme feature vector of at least one phoneme.

When performing embedding processing on at least one phoneme in the phoneme sequence, the generation unit 404 can first convert at least one phoneme into at least one phoneme identifier, and then use a preset phoneme vocabulary to perform embedding processing on at least one phoneme identifier to obtain the phoneme feature vector of at least one phoneme. In the present embodiment, different phonemes correspond to different phoneme identifiers.

That is, the generation unit 404 obtains the phoneme feature vector by converting phonemes into phoneme identifiers and then performing an embedding processing on the phoneme identifiers, which can improve the accuracy of the phoneme feature vector.

When obtaining the semantic feature vector of a character, the generation unit 404 can first obtain the semantic representation of the character, and then perform an embedding processing on the semantic representation of at least one character, thereby obtaining the semantic feature vector of at least one character.

That is, the generation unit 404 obtains the semantic feature vector by converting characters into semantic representations and then performing an embedding processing on the semantic representations, which can improve the accuracy of the semantic feature vector.

When obtaining the fusion feature vector of phonemes according to the phoneme feature vector of phonemes and the semantic feature vector of the characters to which the phonemes belong, the generation unit 404 can obtain the fusion feature vector by adding or concatenating the phoneme feature vector and the semantic feature vector.

That is, the generation unit 404 fuses the semantic feature vector of a character with the phoneme feature vector of at least one phoneme corresponding to the character, enabling a more comprehensive utilization of the semantic information and phoneme information of the text (including the target reference text and the text to be processed) when generating the target audio.

When encoding the target reference audio to obtain at least one reference audio feature vector, the generation unit 404 can first encode the target reference audio and obtain at least one reference audio representation according to the encoding result. The audio representation in the present embodiment can be a digital character, and different audio representations are related to timbre, emotion, etc. Then an embedding processing is performed on at least one reference audio representation to obtain at least one reference audio feature vector.

When obtaining at least one predicted audio feature vector according to the fusion feature vector of at least one phoneme and at least one reference audio feature vector, the generation unit 404 can first fuse the fusion feature vector of at least one phoneme with at least one reference audio feature vector to obtain at least one feature vector to be processed, and then encode at least one feature vector to be processed to obtain at least one predicted audio feature vector.

In addition, the generation unit 404 can also input the fusion feature vector of at least one phoneme and at least one reference audio feature vector into a pre-trained neural network audio encoding model, and use the output result of the neural network audio encoding model as at least one predicted audio feature vector.

When decoding at least one predicted audio feature vector, the generation unit 404 can decode at least one predicted audio feature vector according to the decoding method corresponding to an encoding method of the target reference audio, thereby obtaining the target audio corresponding to the text to be processed.

In the technical solution of the present application, the acquisition, storage, and application of user personal information are in compliance with relevant laws and regulations and do not violate public order and good customs.

According to the embodiments of the present application, the present application also provides an electronic device, a readable storage medium, and a computer program product.

Figure 5:
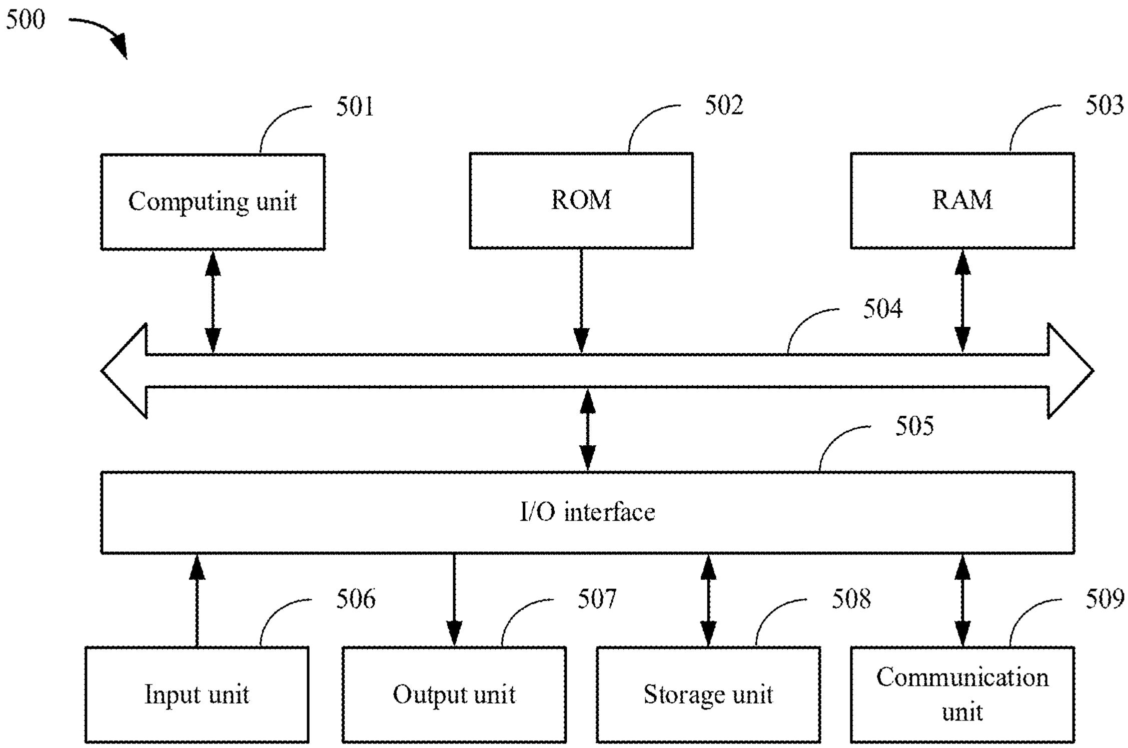
FIG. 5 is a block diagram of an electronic device for implementing the method of audio generation based on a large language model according to the present application.

FIG. 5 is a block diagram of an electronic device for implementing the method of audio generation based on a large language model according to the embodiments of the present application. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital assistants, cellular phones, smartphones, wearable devices, and other similar computing devices. The components shown in the figure, their connections and relationships, and their functions are merely examples and are not intended to limit the implementation of the present application as described and/or claimed herein.

As shown in FIG. 5, the device 500 includes a computing unit 501, which can perform various appropriate actions and processing according to the computer program stored in the read-only memory (ROM) 502 or the computer program loaded from the storage unit 508 into the random access memory (RAM) 503. Various programs and data required for the operation of the device 500 can also be stored in the RAM 503. The computing unit 501, ROM 502, and RAM 503 are interconnected via a bus 504. The input/output (I/O) interface 505 is also connected to the bus 504.

A plurality of components of the device 500 are connected to the I/O interface 505, including: an input unit 506, such as a keyboard, mouse, etc.; an output unit 507, such as various types of displays, speakers, etc.; a storage unit 508, such as disks, optical discs, etc.; and a communication unit 509, such as a network card, modem, wireless communication transceiver, etc. The communication unit 509 allows the device 500 to exchange information/data with other devices through computer networks such as the Internet and/or various telecommunications networks.

The computing unit 501 can be various general-purpose and/or special-purpose processing components with processing and computing capabilities. Examples of the computing unit 501 include, but are not limited to, central processing units (CPUs), graphics processing units (GPUs), various special-purpose artificial intelligence (AI) computing chips, various computing units running machine learning model algorithms, digital signal processors (DSPs), and any appropriate processors, controllers, microcontrollers, etc. The computing unit 501 executes the various methods and processes described above, such as the audio generation method based on a large language model. For example, in some embodiments, the audio generation method based on a large language model can be implemented as a computer software program tangibly contained in a machine-readable medium, such as the storage unit 508.

In some embodiments, part or all of the computer program can be loaded and/or installed on the device 500 via the ROM 502 and/or the communication unit 509. When the computer program is loaded into the RAM 503 and executed by the computing unit 501, one or more steps of the audio generation method based on a large language model described above can be executed. Alternatively, in other embodiments, the computing unit 501 can be configured to execute the audio generation method based on a large language model by any other suitable means, such as firmware.

Various embodiments of the systems and techniques described herein can be implemented in digital electronic circuitry, integrated circuits, field-programmable gate arrays (FPGAs), application-specific integrated circuits (ASICs), application-specific standard products (ASSPs), system-on-a-chip systems (SOCs), complex programmable logic devices (CPLDs), computer hardware, firmware, software, and/or combinations thereof. These various embodiments can include: implementation in one or more computer programs, which can be executed and/or interpreted on a programmable system including at least one programmable processor, which can be a special-purpose or general-purpose programmable processor, receiving data and instructions from a storage system, at least one input device, and at least one output device, and transmitting data and instructions to the storage system, the at least one input device, and the at least one output device.

Program code for implementing the methods of the present disclosure can be written in any combination of one or more programming languages. The program code can be provided to a general-purpose computer, special-purpose computer, or other programmable audio generation apparatus based on a large language model for processing or controlling, such that the program code, when executed by the processor or controller, causes the functions/operations specified in the flowcharts and/or block diagrams to be implemented. The program code can be fully executed on the machine, partially executed on the machine, partially executed on the machine and partially on a remote machine, or fully executed on a remote machine or server.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium can include, but is not limited to, electronic, magnetic, optical, electromagnetic, infrared, or semiconductor systems, apparatus, or devices, or any suitable combination thereof. More specific examples of machine-readable storage media would include an electrical connection based on one or more wires, a portable computer disk, a hard disk, random access memory (RAM), read-only memory (ROM), erasable programmable read-only memory (EPROM or flash memory), optical fiber, a portable compact disc read-only memory (CD-ROM), an optical storage device, a magnetic storage device, or any suitable combination thereof.

To provide interaction with a user, the systems and techniques described herein can be implemented on a computer having a display device (e.g., a CRT (cathode ray tube) or LCD (liquid crystal display) monitor) for displaying information to the user; a keyboard and a pointing device (e.g., a mouse or a trackball) by which the user can provide input to the computer. Other types of devices can also be used to provide interaction with the user; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a backend component (e.g., as a data server), or a middleware component (e.g., an application server), or a frontend component (e.g., a user computer with a graphical user interface or a web browser through which a user can interact with the implementation of the systems and techniques described herein), or any combination of such backend, middleware, or frontend components. The components of the system can be interconnected by any form or medium of digital data communication (e.g., a communication network). Examples of communication networks include a local area network (LAN), a wide area network (WAN), and the Internet.

The computing system can include clients and servers. Clients and servers generally operate remotely from each other and typically interact through a communication network. The relationship between clients and servers is produced by running corresponding computer programs on respective computers that have a client-server relationship. A server can be a cloud server, also known as a cloud computing server or cloud host, which is a host product in the cloud computing service system, addressing the shortcomings of traditional physical hosts and VPS services ("Virtual Private Server", or simply "VPS") in terms of management difficulty and weak business scalability. The server can also be a server in a distributed system or a server combined with blockchain technology.

It should be understood that various forms of processes shown above can be used, with steps reordered, added, or deleted. For example, the steps described in the present disclosure can be executed in parallel, sequentially, or in different orders, as long as the desired results of the technical solution disclosed in the present disclosure are achieved, and this is not limited herein.

The specific embodiments described above do not constitute a limitation on the scope of protection of the present disclosure. Those skilled in the art should understand that various modifications, combinations, sub-combinations, and substitutions can be made according to design requirements and other factors. Any modifications, equivalent substitutions, and improvements made within the spirit and principle of the present disclosure shall be included within the scope of protection of the present disclosure.

What is claimed is:

1. A computer-implemented method of audio generation based on a large language model, comprising: acquiring a text to be processed; parsing the text to be processed using the large language model to obtain role information and emotional information corresponding to the text to be processed; obtaining a target reference text and a target reference audio according to the role information and the emotional information; and generating a target audio which corresponds to the text to be processed according to the text to be processed, the target reference text, and the target reference audio, wherein the obtaining the target reference text and the target reference audio according to the role information and the emotional information comprises: selecting a dataset corresponding to the role information from a plurality of datasets as a target dataset; which include reference texts and reference audios corresponding to different emotions of the role; selecting the reference text and the reference audio corresponding to the emotional information from the target dataset as the target reference text and the target reference audio, wherein the generating the target audio which corresponds to the text to be processed according to the text to be processed, the target reference text, and the target reference audio comprises: obtaining a fusion feature vector of at least one phoneme in a text by concatenating a phoneme feature vector of the at least one phoneme and a semantic feature vector of a character to which the at least one phoneme belongs, wherein the text includes the text to be processed and the target reference text; encoding the target reference audio to obtain at least one reference audio feature vector; obtaining at least one predicted audio feature vector according to the fusion feature vector of the at least one phoneme and the reference audio feature vector of the at least one phoneme; decoding the at least one predicted audio feature vector to obtain the target audio which corresponds to the text to be processed.

2. The method of claim 1, further comprising:

in response to determining that there is no dataset corresponding to the role information, acquiring role annotation information output by the large language model;

selecting a dataset corresponding to the role annotation information from the plurality of datasets as the target dataset.

3. The method of claim 1, wherein the encoding the target reference audio to obtain the at least one reference audio feature vector comprises:

encoding the target reference audio to obtain at least one reference audio representation;

performing an embedding processing on the at least one reference audio representation to obtain the at least one reference audio feature vector.

4. The method of claim 1, wherein the obtaining the at least one predicted audio feature vector according to the fusion feature vector of the at least one phoneme and the reference audio feature vector of the at least one phoneme comprises:

fusing the fusion feature vector of the at least one phoneme with the reference audio feature vector of the at least one phoneme to obtain at least one feature vector to be processed;

encoding the at least one feature vector to be processed to obtain the at least one predicted audio feature vector.

5. The method of claim 1, wherein the decoding the at least one predicted audio feature vector comprises:

decoding the at least one predicted audio feature vector according to a decoding method corresponding to an encoding method of the target reference audio.

6. An electronic device, comprising: at least one processor; and a memory communicatively connected with the at least one processor; wherein the memory stores instructions executable by the at least one processor, and the instructions are executed by the at least one processor to enable the at least one processor to perform a method of audio generation based on a large language model, wherein the method comprises: acquiring a text to be processed; parsing the text to be processed using the large language model to obtain role information and emotional information corresponding to the text to be processed; obtaining a target reference text and a target reference audio according to the role information and the emotional information; and generating a target audio which corresponds to the text to be processed according to the text to be processed, the target reference text, and the target reference audio, wherein the obtaining the target reference text and the target reference audio according to the role information and the emotional information comprises: selecting a dataset corresponding to the role information from a plurality of datasets as a target dataset; which include reference texts and reference audios corresponding to different emotions of the role; selecting the reference text and the reference audio corresponding to the emotional information from the target dataset as the target reference text and the target reference audio, wherein the generating the target audio which corresponds to the text to be processed according to the text to be processed, the target reference text, and the target reference audio comprises: obtaining a fusion feature vector of at least one phoneme in a text by concatenating a phoneme feature vector of the at least one phoneme and a semantic feature vector of a character to which the at least one phoneme belongs, wherein the text includes the text to be processed and the target reference text; encoding the target reference audio to obtain at least one reference audio feature vector; obtaining at least one predicted audio feature vector according to the fusion feature vector of the at least one phoneme and the reference audio feature vector of the at least one phoneme; decoding the at least one predicted audio feature vector to obtain the target audio which corresponds to the text to be processed.

7. The electronic device of claim 6, further comprising:

in response to determining that there is no dataset corresponding to the role information, acquiring role annotation information output by the large language model;

selecting a dataset corresponding to the role annotation information from the plurality of datasets as the target dataset.

8. The electronic device of claim 6, wherein the encoding the target reference audio to obtain the at least one reference audio feature vector comprises:

encoding the target reference audio to obtain at least one reference audio representation;

performing an embedding processing on the at least one reference audio representation to obtain the at least one reference audio feature vector.

9. The electronic device of claim 6, wherein the obtaining the at least one predicted audio feature vector according to the fusion feature vector of the at least one phoneme and the reference audio feature vector of the at least one phoneme comprises:

fusing the fusion feature vector of the at least one phoneme with the reference audio feature vector of the at least one phoneme to obtain at least one feature vector to be processed;

encoding the at least one feature vector to obtain the at least one predicted audio feature vector to be processed.

10. The electronic device of claim 6, wherein the decoding the at least one predicted audio feature vector comprises:

decoding the at least one predicted audio feature vector according to a decoding method corresponding to an encoding method of the target reference audio.

11. A non-transitory computer readable storage medium with computer instructions stored thereon, wherein the computer instructions are used for causing a method of audio generation based on a large language model, wherein the method comprises: acquiring a text to be processed; parsing the text to be processed using the large language model to obtain role information and emotional information corresponding to the text to be processed; obtaining a target reference text and a target reference audio according to the role information and the emotional information; and generating a target audio which corresponds to the text to be processed according to the text to be processed, the target reference text, and the target reference audio, wherein the obtaining the target reference text and the target reference audio according to the role information and the emotional information comprises: selecting a dataset corresponding to the role information from a plurality of datasets as a target dataset; which include reference texts and reference audios corresponding to different emotions of the role; selecting the reference text and the reference audio corresponding to the emotional information from the target dataset as the target reference text and the target reference audio, wherein the generating the target audio which corresponds to the text to be processed according to the text to be processed, the target reference text, and the target reference audio comprises: obtaining a fusion feature vector of at least one phoneme in a text by concatenating a phoneme feature vector of the at least one phoneme and a semantic feature vector of a character to which the at least one phoneme belongs, wherein the text includes the text to be processed and the target reference text; encoding the target reference audio to obtain at least one reference audio feature vector; obtaining at least one predicted audio feature vector according to the fusion feature vector of the at least one phoneme and the reference audio feature vector of the at least one phoneme; decoding the at least one predicted audio feature vector to obtain the target audio which corresponds to the text to be processed.

12. The non-transitory computer readable storage medium of claim 11, further comprising:

in response to determining that there is no dataset corresponding to the role information, acquiring role annotation information output by the large language model;

selecting a dataset corresponding to the role annotation information from the plurality of datasets as the target dataset.

13. The non-transitory computer readable storage medium of claim 11, wherein the encoding the target reference audio to obtain the at least one reference audio feature vector comprises:

encoding the target reference audio to obtain at least one reference audio representation;

performing an embedding processing on the at least one reference audio representation to obtain the at least one reference audio feature vector.

14. The non-transitory computer readable storage medium of claim 11, wherein the obtaining the at least one predicted audio feature vector according to the fusion feature vector of the at least one phoneme and the reference audio feature vector of the at least one phoneme comprises:

fusing the fusion feature vector of the at least one phoneme with the reference audio feature vector of the at least one phoneme to obtain at least one feature vector to be processed;

encoding the at least one feature vector to be processed to obtain the at least one predicted audio feature vector.

* * * * *